US 8,170,781 B2

(12) United States Patent
Fuwa

(10) Patent No.: US 8,170,781 B2
(45) Date of Patent: May 1, 2012

(54) INVERTED WHEEL TYPE MOVING BODY AND METHOD OF CONTROLLING THE SAME

(75) Inventor: Toshio Fuwa, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 491 days.

(21) Appl. No.: 12/375,943

(22) PCT Filed: Apr. 24, 2008

(86) PCT No.: PCT/JP2008/057910
§ 371 (c)(1),
(2), (4) Date: Feb. 2, 2009

(87) PCT Pub. No.: WO2008/136342
PCT Pub. Date: Nov. 13, 2008

(65) Prior Publication Data
US 2009/0319124 A1 Dec. 24, 2009

(30) Foreign Application Priority Data
Apr. 27, 2007 (JP) .................. 2007-117972

(51) Int. Cl.
*B62K 17/00* (2006.01)
(52) U.S. Cl. ........... 701/124; 180/7.1; 180/21; 180/218; 701/70
(58) Field of Classification Search .................. 701/124, 701/37, 70; 180/218, 7.1, 21; 280/63–64, 280/5.514, 6.157, 781
See application file for complete search history.

(56) References Cited

U.S. PATENT DOCUMENTS

| | | | | |
|---|---|---|---|---|
| 5,975,225 | A * | 11/1999 | Kamen et al. .................. | 180/7.1 |
| 6,405,816 | B1 * | 6/2002 | Kamen et al. ................. | 180/65.1 |
| 6,553,271 | B1 * | 4/2003 | Morrell .......................... | 700/75 |

(Continued)

FOREIGN PATENT DOCUMENTS

JP    8-119175    5/1996

(Continued)

OTHER PUBLICATIONS

Office Action for Canadian Appl. No. 2,658,310 dated Oct. 24, 2011.

*Primary Examiner* — Ruth Ilan
*Assistant Examiner* — James English
(74) *Attorney, Agent, or Firm* — Finnegan, Henderson, Farabow, Garrett & Dunner, LLP

(57) ABSTRACT

An inverted wheel type moving body according to the present invention includes a right chassis 17 and a left chassis 19 rotationally supporting wheels, motors 34 and 36 rotationally driving a right driving wheel 18 and a left driving wheel 20, a body 12 rotatably supported on the right chassis 17 and the left chassis 19 through a right arm 14 and a left arm 16, lower joint motors 65 and 95 disposed in the right arm 14 and the left arm 16 and varying vehicle height, a travel control module 81 controlling the motors 34 and 36 so as to follow calculated accelerations, and a posture control module 82 controlling the lower joint motors 65 and 95 to lower the vehicle height and change a position of a center of mass of the body 12 with respect to an axle in a front-back direction in accordance with the accelerations when the accelerations exceeds a certain range.

8 Claims, 5 Drawing Sheets

U.S. PATENT DOCUMENTS

| | | | | |
|---|---|---|---|---|
| 6,571,892 B2* | 6/2003 | Kamen et al. | | 180/8.2 |
| 6,915,878 B2* | 7/2005 | Kamen et al. | | 182/141 |
| 7,152,882 B2* | 12/2006 | Tokumaru et al. | | 280/758 |
| 7,357,202 B2* | 4/2008 | Kamen et al. | | 180/65.1 |
| 7,363,993 B2* | 4/2008 | Ishii | | 180/7.1 |
| 7,690,452 B2* | 4/2010 | Kamen et al. | | 180/65.1 |
| 7,823,676 B2* | 11/2010 | Yamada et al. | | 180/218 |
| 7,866,429 B2* | 1/2011 | Ishii et al. | | 180/218 |
| 7,900,725 B2* | 3/2011 | Heinzmann et al. | | 180/65.1 |
| 2002/0121394 A1 | 9/2002 | Kamen et al. | | |
| 2005/0121238 A1* | 6/2005 | Ishii | | 180/65.1 |
| 2006/0097683 A1* | 5/2006 | Hosoda et al. | | 318/568.12 |
| 2008/0164083 A1* | 7/2008 | Miki et al. | | 180/165 |
| 2009/0018743 A1* | 1/2009 | Yamada | | 701/74 |
| 2009/0051136 A1* | 2/2009 | Yamada et al. | | 280/205 |
| 2009/0108553 A1* | 4/2009 | Serai et al. | | 280/80.1 |
| 2010/0017069 A1* | 1/2010 | Miki et al. | | 701/48 |
| 2010/0057319 A1* | 3/2010 | Inaji et al. | | 701/70 |
| 2010/0071984 A1* | 3/2010 | Doi et al. | | 180/218 |
| 2010/0114421 A1* | 5/2010 | Doi | | 701/29 |
| 2010/0174476 A1* | 7/2010 | Fuwa | | 701/124 |
| 2010/0280745 A1* | 11/2010 | Gorai | | 701/124 |
| 2010/0305840 A1* | 12/2010 | Doi | | 701/124 |
| 2011/0010066 A1* | 1/2011 | Fuwa | | 701/70 |
| 2011/0071752 A1* | 3/2011 | Takenaka et al. | | 701/124 |
| 2011/0098884 A1* | 4/2011 | Doi | | 701/36 |

FOREIGN PATENT DOCUMENTS

| | | |
|---|---|---|
| JP | 2003-271243 | 9/2003 |
| JP | 2003-528756 | 9/2003 |
| JP | 2005-112300 | 4/2005 |
| JP | 2006-306375 | 11/2006 |
| JP | 2007-11634 | 1/2007 |
| WO | WO 2006095823 A1 * | 9/2006 |

* cited by examiner

INVERTED WHEEL TYPE MOVING BODY AND METHOD OF CONTROLLING THE SAME

CROSS-REFERENCE TO RELATED APPLICATIONS

This application is a national phase application of International Application No. PCT/JP2008/057910, filed Apr. 24, 2008, and claims the priority of Japanese Application No. 2007-117972, filed Apr. 27, 2007, the contents of both of which are incorporated herein by reference.

TECHNICAL FIELD

The present invention relates to an inverted wheel type moving body and a method of controlling the same.

BACKGROUND ART

An inverted wheel type moving body such as an inverted two-wheel vehicle is typically controlled to travel in such a manner that the position of the center of mass of the body is constantly corrected to maintain the stable state by driving right and left driving wheels (Patent Document 1). A vehicle (moving body) of Patent Document 1 includes a sensor detecting a physical value based on the inclination of the vehicle. When the physical value detected by the sensor exceeds a predetermined value, a balancer is moved. Accordingly, the posture of the vehicle is controlled.

By the way, it is required to control such a moving body at a desired traveling velocity. For example, it is important for the moving body to perform zippy acceleration or deceleration with complete freedom to travel in such a manner that it follows the target velocity with accuracy. Further, when the moving body moves in parallel with a pedestrian, the moving body needs to travel slowly. However, the traveling velocity depends entirely on the natural frequency of the inverted wheel type moving body. In other words, the traveling velocity is limited according to the natural frequency that is determined by the inertia, the vehicle weight, and the distance from the center of the wheels to the center of the body. Accordingly, there is a problem according to the related moving body that it takes long time from the time when an operator operates an accelerator to the time when the velocity reaches the desired velocity. Further, as the inverted state is maintained by changing rotational velocity of the wheels according to the moving body of the related art, it is difficult to travel at a certain velocity. As stated above, it is difficult to enhance the controllability according to the related moving body.

[Patent Document 1]
Japanese Unexamined Patent Application Publication No. 2006-306375

DISCLOSURE OF THE INVENTION

Problem to be Solved by the Invention

As stated above, according to the related inverted wheel type moving body, it is difficult to improve the controllability.

The present invention has been made to overcome such a problem, and it is an object of the present invention to provide an inverted wheel type moving body which enables to improve the controllability in a simple way and a method of controlling the same.

Means for Solving the Problem

According to a first aspect of the present invention, there is provided an inverted wheel type moving body accelerating or decelerating according to operation by an operator, the inverted wheel type moving body including a chassis rotationally supporting a wheel, a first drive portion rotationally driving the wheel, a body rotatably supported on the chassis through a support member, a second drive portion disposed in the support member and varying vehicle height of the inverted wheel type moving body, a first control portion controlling the first drive portion so as to follow accelerations calculated based on the operation by the operator, and a second control portion controlling the second drive portion to lower the vehicle height and change a position of a center of mass of the body with respect to an axle of the wheel in a front-back direction in accordance with the accelerations when the accelerations exceeds a certain range. According to this structure, the vehicle height is made lower in performing the quick operation. Accordingly, quick acceleration can be realized, and the controllability can be enhanced in a simple manner.

The inverted wheel type moving body according to a second aspect of the present invention is the above-described inverted wheel type moving body that controls the second drive portion to move the position of the center of mass of the body with respect to the axle of the wheel in the front-back direction and to change the vehicle height in accordance with a target velocity calculated based on the operation by the operator when the accelerations is within the certain range. Accordingly, the position of the center of mass of the body varies according to the target velocity, and the control in accordance with the target velocity can be realized. Accordingly, smooth movement can be realized, and the controllability can be enhanced.

According to a third aspect of the present invention, there is provided an inverted wheel type moving body accelerating or decelerating according to operation by an operator, the inverted wheel type moving body including a chassis rotationally supporting a wheel, a first drive portion rotationally driving the wheel, a body rotatably supported on the chassis through a support member, a second drive portion disposed in the support member and varying vehicle height of the inverted wheel type moving body, a first control portion controlling the first drive portion to allow the inverted wheel type moving body to reach a target velocity calculated based on the operation by the operator, and a second control portion controlling the second drive portion to move a position of a center of mass of the body with respect to an axle of the wheel in a front-back direction and to change the vehicle height in accordance with the target velocity. Accordingly, the position of the center of mass of the body varies according to the target velocity, and the control in accordance with the target velocity can be realized. Accordingly, smooth movement can be realized, and the controllability can be enhanced.

The inverted wheel type moving body according to a fourth aspect of the present invention is the above-described inverted wheel type moving body, in which the first drive portion applies torque to the wheel to move the wheel in a direction opposite to a direction moving the position of the center of mass of the body in accordance with a timing at which the position of the center of mass of the body varies. Accordingly, the position of the center of mass can be quickly moved, and the controllability can be enhanced.

According to a fifth aspect of the present invention, there is provided a method of controlling an inverted wheel type moving body, the inverted wheel type moving body including a chassis rotationally supporting a wheel, a first drive portion rotationally driving the wheel, a body rotatably supported on the chassis through a support member, and a second drive portion disposed in the support member and varying vehicle height, the method including a step of calculating accelerations based on operation by an operator, a step of driving the first drive portion to allow the inverted wheel type moving body to follow the accelerations, and a step of driving the second drive portion to lower the vehicle height and change a position of a center of mass of the body with respect to an axle of the wheel in a front-back direction in accordance with the accelerations when the accelerations exceeds a certain range. In this structure, the vehicle height is made lower in performing the quick operation. Accordingly, the quick acceleration can be realized, and the controllability can be enhanced in a simple manner.

The method of controlling the inverted wheel type moving body according to a sixth aspect of the present invention is the above-described control method, including controlling the second drive portion to move the position of the center of mass of the body with respect to the axle of the wheel in the front-back direction and to change the vehicle height in accordance with a target velocity calculated based on the operation by the operator when the accelerations is within the certain range. Accordingly, the position of the center of mass of the body varies according to the target velocity, and the control in accordance with the target velocity can be realized. Accordingly, smooth movement can be realized, and the controllability can be enhanced.

According to a seventh aspect of the present invention, there is provided a method of controlling the inverted wheel type moving body, the inverted wheel type moving body including a chassis rotationally supporting a wheel, a first drive portion rotationally driving the wheel, a body rotatably supported on the chassis through a support member, and a second drive portion disposed in the support member and varying vehicle height, the method including a step of calculating a target velocity based on operation by an operator, a step of driving the first drive portion to allow the inverted wheel type moving body to reach the target velocity, and a step of driving the second drive portion to move a position of a center of mass of the body with respect to an axle of the wheel in a front-back direction and to change the vehicle height in accordance with the target velocity. Accordingly, the position of the center of mass of the body varies according to the target velocity, and the control in accordance with the target velocity can be realized. Accordingly, smooth movement can be realized, and the controllability can be enhanced.

The method of controlling the inverted wheel type moving body according to an eighth aspect of the present invention is above-described control method, in which the first drive portion applies torque to the wheels to move the wheels in a direction opposite to a direction moving the position of the center of mass of the body in accordance with a timing at which the position of the center of mass of the body varies. Accordingly, the position of the center of mass can be quickly moved, and the controllability can be enhanced.

Advantageous Effects of the Invention

According to the present invention, it is an object to provide an inverted wheel type moving body which enables to improve the controllability in a simple manner and a method of controlling the same.

Figure 1:
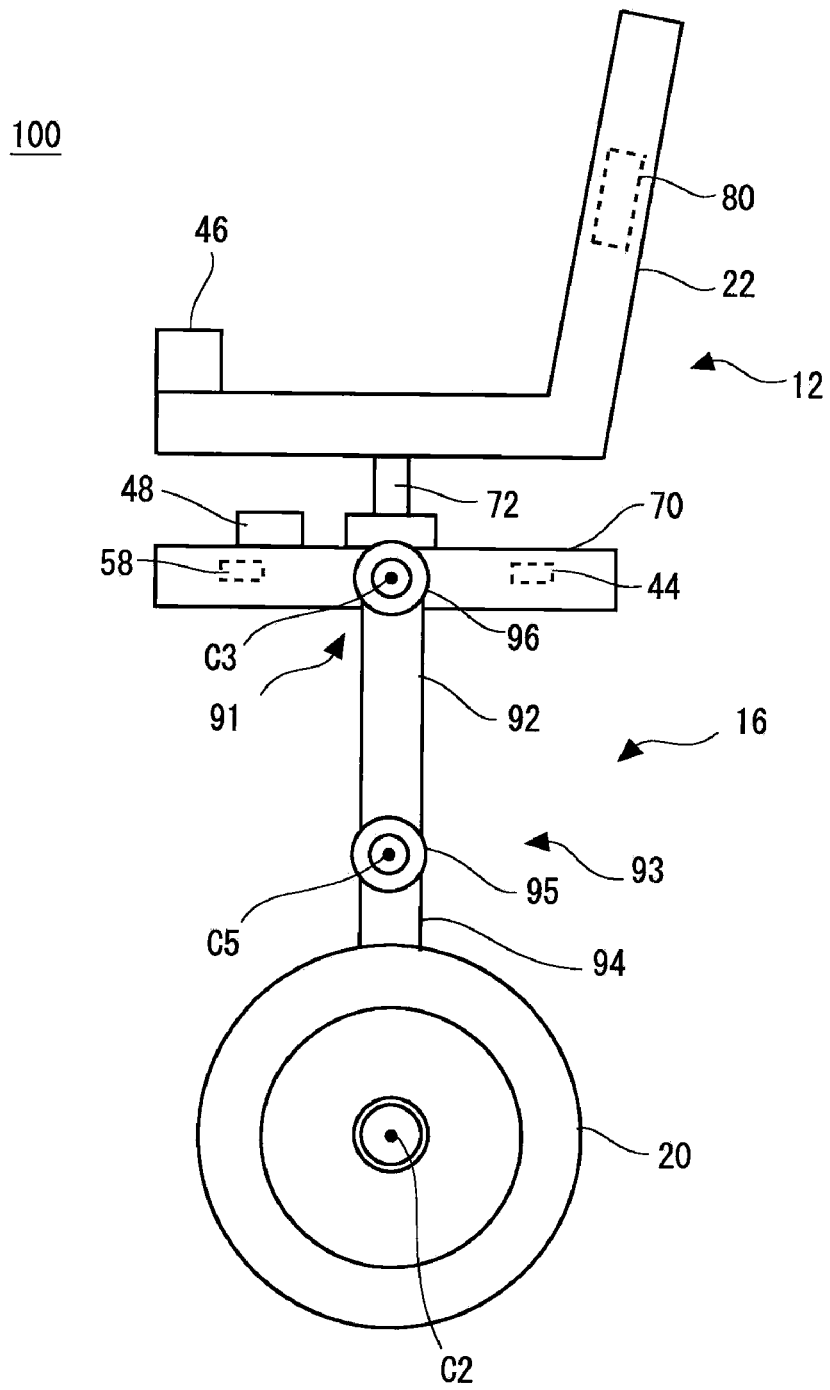
[FIG. 1] A side view showing the structure of a moving body according to an embodiment of the present invention.

DESCRIPTION OF REFERENCE NUMERALS 12 body
14 right arm
17 right chassis
16 left arm
19 left chassis
18 right driving wheel
20 left driving wheel
22 passenger seat
26 rod
28 mount
30 axle
32 axle
34 right wheel drive motor
36 left wheel drive motor
48 gyro-sensor
52 right wheel encoder
54 left wheel encoder
61 upper joint
62 upper link
63 lower joint
64 lower link
65 lower joint motor
66 upper joint motor
70 pedestal
72 column
80 control portion
81 travel control module
82 posture control module
91 upper joint
92 upper link
93 lower joint
94 lower link
95 lower joint motor
96 upper joint motor
100 moving body
101 moving body

BEST MODES FOR CARRYING OUT THE INVENTION

A moving body according to the present embodiment is an inverted wheel type moving body that travels by the inverted pendulum control. The moving body travels to the desired place by driving wheels that contact with the ground. In addition, the moving body can be maintained at an inverted state by driving the wheels in response to an output from a gyro-sensor or the like. Accordingly, the moving body accelerates or decelerates according to the operation by an operator.

Figure 2:
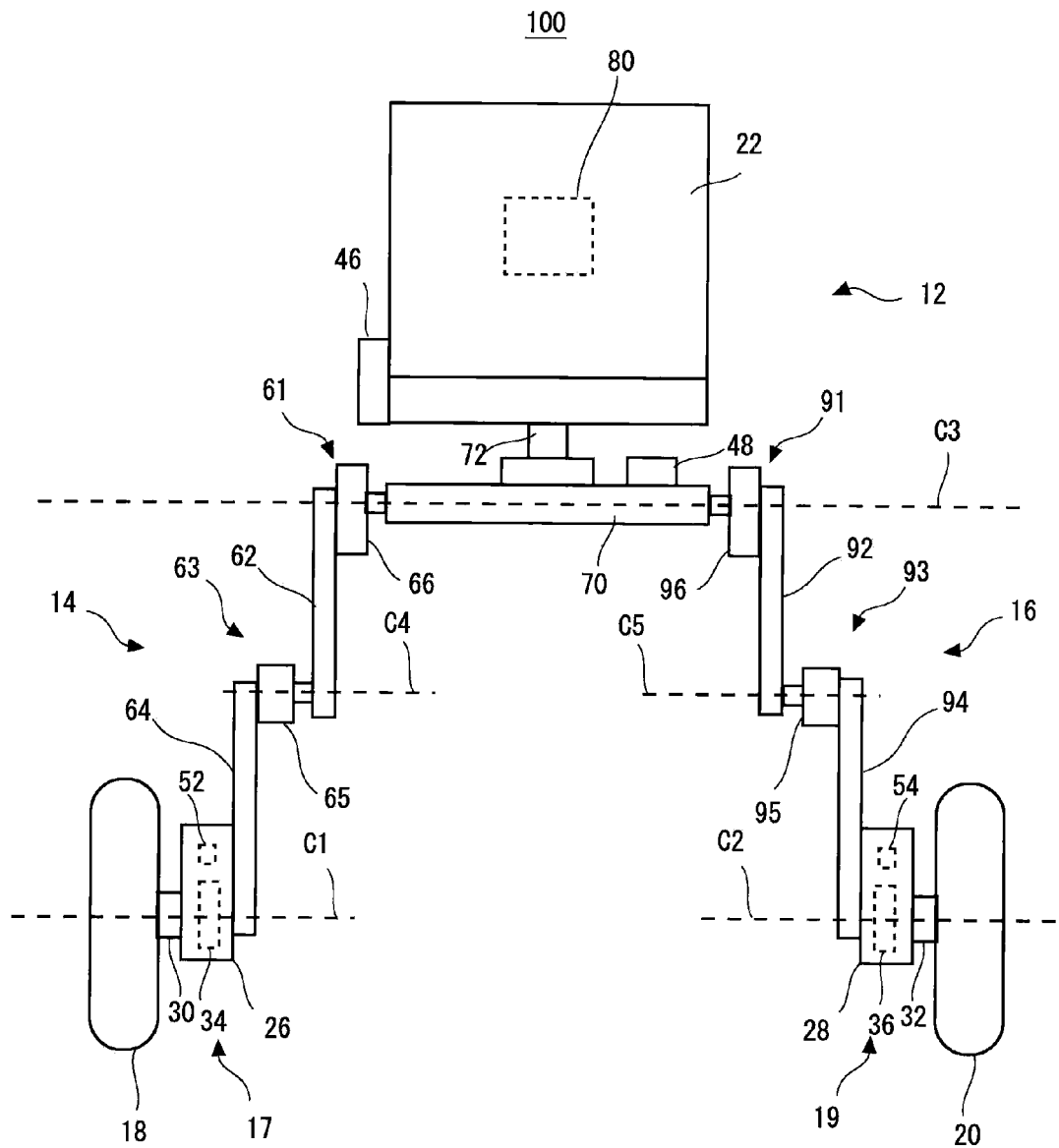
[FIG. 2] A front view showing the structure of the moving body according to the embodiment of the present invention.

Referring to FIGS. 1 and 2, the structure of a moving body 100 according to the present embodiment will be described. FIG. 1 is a side view schematically showing the structure of the moving body 100. FIG. 2 is a front view schematically showing the structure of the moving body 100.

As shown in FIG. 2, the moving body 100 is an inverted wheel type moving body (traveling body), and includes a right driving wheel 18, a left driving wheel 20, a right chassis 17, a left chassis 19, a right arm 14, a left arm 16, and a body 12. The body 12 is an upper body portion of the moving body 100 disposed above the right driving wheel 18 and the left driving wheel 20. Here, the traveling direction of the moving body 100 (direction perpendicular to the paper in which FIG. 2 is drawn) is referred to as front-back direction, and a direction perpendicular to the front-back direction in the horizontal plane is referred to as lateral direction (transverse direction). Thus, FIG. 2 is a diagram of the moving body 100 when seen from the front side in the traveling direction, and FIG. 1 is a diagram of the moving body 100 when seen from the left side.

The right arm 14 and the left arm 16 are swing arms including joints. When the moving body travels, the right arm 14 and the left arm 16 adjust the vehicle height. Further, the right arm 14 and the left arm 16 are driven in accordance with the inclination angle of the body 12. Specifically, when the body 12 is inclined in the lateral direction in accordance with the inclination angle of the ground, one of the arms is driven to make the body 12 parallel. For example, assume a situation in which only the right driving wheel 18 runs on a step while the moving body is traveling on the level ground, or a situation in which the moving body is traveling from the level ground to the inclined ground where the right side is higher than the left side. In this case, the height with respect to the horizontal direction varies between the right driving wheel 18 and the left driving wheel 20. In summary, the right driving wheel 18 becomes higher than the left driving wheel 20. In this case, the right arm 14 is shorten to adjust the inclination angle of the body 12. For example, the joint of the right arm 14 is driven to bend the right arm 14 into a dog leg shape. Thus, the right arm 14 becomes shorter, and the body 12 can be made parallel in the transverse direction (lateral direction). Note that the structure of the right arm 14 and the left arm 16 will be described later.

On the side surface side of the right chassis 17, the right driving wheel 18 that contacts with the ground is provided. On the side surface side of the left chassis 19, the left driving wheel 20 that contacts with the ground is provided. The right driving wheel 18 and the left driving wheel 20 are a pair of wheels that rotate on the same axis. The moving body 100 moves by the rotation of the right driving wheel 18 and the left driving wheel 20 that contact with the ground.

Between the right driving wheel 18 and the right arm 14, the right chassis 17 is disposed. The right chassis 17 includes a right mount 26. Between the right arm 14 and the right driving wheel 18, the right mount 26 is disposed. The right mount 26 is fixed to the side end of the right arm 14. The right chassis 17 rotationally supports the right driving wheel 18 through an axle 30. The right driving wheel 18 is fixed to a rotation axis C1 of a right wheel drive motor 34 through the axle 30. The right wheel drive motor 34 is fixed into the right mount 26, and functions as a drive portion (actuator) for the wheel. In short, the right wheel drive motor 34 rotationally drives the right driving wheel 18.

Between the left driving wheel 20 and the left arm 16, the left chassis 19 is disposed. The left chassis 19 includes a left mount 28. Between the left arm 16 and the left driving wheel 20, the left mount 28 is disposed. The left mount 28 is fixed to the side end of the left arm 16. The left mount 28 rotationally supports the left driving wheel 20 through an axle 32. The left driving wheel 20 is fixed to a rotation axis C2 of a left wheel drive motor 36 through the axle 32. The left wheel drive motor 36 is fixed into the left mount 28, and functions as a drive portion (actuator) for the wheel. In short, the left wheel drive motor 36 rotationally drives the left driving wheel 20. Between the right driving wheel 18 and the left driving wheel 20, the right chassis 17 and the left chassis 19 are disposed. The right chassis 17 may be fixed to the left chassis 19 in order to dispose the right driving wheel 18 and the left driving wheel 20 on the same axis.

The right wheel drive motor 34 and the left wheel drive motor 36 are, for example, servomotors. The actuators for the wheels are not limited to electrical motors, and actuators using air pressure or oil pressure may also be used.

The right mount 26 further includes a right wheel encoder 52. The right wheel encoder 52 detects the rotation angle of the right driving wheel 18 as the rotation amount of the right driving wheel 18. The left mount 28 includes a left wheel encoder 54. The left wheel encoder 54 detects the rotation angle of the left driving wheel 20 as the rotation amount of the left driving wheel 20.

The left arm 16 is mounted to the side end of the left driving wheel 20 through the left mount 28. The left arm 16 includes an upper joint 91, an upper link 92, a lower joint 93, and a lower link 94. The upper link 92 and the lower link 94 are rod-shaped members. The upper link 92 and the lower link 94 are rigid bodies having substantially the same length. The upper joint 91 and the lower joint 93 are rotary joints.

The lower link 94 is connected to the left mount 28. In short, the left mount 28 is mounted to the lower end of the lower link 94. The left mount 28 rotatably supports the lower link 94. Further, the lower joint 93 is disposed to the lower link 94. The lower link 94 is connected to the upper link 92 through the lower joint 93. In summary, the lower joint 93 disposed to the upper end of the lower link 94 is disposed to the lower end of the upper link 92.

The lower joint 93 includes a lower joint motor 95. When the lower joint motor 95 is driven, the upper link 92 rotates. When the lower joint motor 95 is driven, the angle of the upper link 92 with respect to the lower link 94 varies. As will be shown, the lower joint 93 is disposed in the middle of the left arm 16. In summary, the lower joint 93 is disposed between the upper link 92 and the lower link 94. The upper link 92 is fixed to a rotation axis C5 of the lower joint motor 95.

The upper joint 91 is provided in the upper end of the upper link 92. The upper joint 91 connects the upper link 92 and the body 12. The left arm 16 is connected to the body 12 through the upper joint 91. As stated, the upper joint 91 is provided in the upper end of the left arm 16. Further, the upper joint 91 includes an upper joint motor 96. The body 12 is mounted to the left arm 16 through the upper joint motor 96. When the upper joint motor 96 is driven, the body 12 rotates. In summary, when the upper joint motor 96 is driven, the angle of the body 12 with respect to the upper link 92 varies. The body 12 is fixed to a rotation axis C3 of the upper joint motor 96.

When the upper joint 91 and the lower joint 93 are driven, the posture of the body 12 varies. In summary, the left arm 16 is a link that connects the body 12 with the left driving wheel 20. Thus, the lower end side of the left arm 16 is connected to the rotation axis C2 of the left driving wheel 20, and the upper end side thereof is connected to the rotation axis C3 of the body 12. The left arm 16 functions as an arm of two degree of freedom including two rotary joints. In summary, the left arm 16 functions as an arm including a plurality of joints, and connects the body 12 with the right chassis 17.

The longitudinal direction of the left arm 16 is perpendicular to the rotation axis C2. Thus, the longitudinal direction of the lower link 94 and the rotation axis C2 are perpendicular to each other. When the moving body travels normally, the upper link 92 and the lower link 94 are provided along with the vertical direction. Thus, the rotation angle of the lower joint motor 95 is fixed so that the upper link 92 and the lower link 94 become parallel to each other. The body 12 is rotationally supported with respect to the rotation axis C2 through the left arm 16. The rotation axis C2 and the rotation axis C5 are disposed in parallel with a distance corresponding to the length of the lower link 94. The rotation axis C3 and the rotation axis C5 are disposed in parallel with a distance corresponding to the length of the upper link 92. When the moving body travels normally, the rotation axis C3 is parallel with the rotation axis C5.

The right arm 14 is mounted to the side end of the right driving wheel 18 through the right mount 26. The right arm 14 includes an upper joint 61, an upper link 62, a lower joint 63, and a lower link 64. The upper link 62 is connected to the body 12 through the upper joint 61. Further, the lower link 64 is connected to the right chassis 17. Further, the lower link 64 and the upper link 62 are connected through the lower joint 63. The lower joint 63 includes a lower joint motor 65. The upper joint 61 includes an upper joint motor 66. As stated above, the right arm 14 also functions as an arm of two degree of freedom including two joints, as is the same as the left arm 66. As the structure of the right arm 14 is the same as that of the left arm 16, the description will be omitted. Note that the rotation axis of the lower joint motor 65 of the right arm 14 is a rotation axis C4. Further, the upper joint motor 66 rotates about the rotation axis C3.

When the upper joint 61 and the lower joint 63 of the right arm 14 are driven, the posture of the body 12 varies. In summary, the right arm 14 is a link that connects the body 12 with the right driving wheel 18. Thus, the lower end side of the right arm 14 is connected to the rotation axis C1 of the right driving wheel 18, and the upper end side thereof is connected to the rotation axis C3 of the body 12. The right arm 14 functions as an arm of two degree of freedom including two rotary joints. In summary, the right arm 14 functions as an arm including a plurality of joints, and connects the body 12 with the right chassis 17.

The longitudinal direction of the right arm 14 is perpendicular to the rotation axis C1. Thus, the longitudinal direction of the lower link 94 and the rotation axis C1 are perpendicular to each other. When the moving body travels normally, the upper link 62 and the lower link 64 are arranged on the same axis. In summary, the rotation angle of the lower joint motor 65 is fixed so that the upper link 62 and the lower link 64 are collinearly arranged when seen from the side surface. The body 12 is rotationally supported with respect to the rotation axis C1 through the right arm 14. Further, when the moving body travels normally, the rotation axis C1, the rotation axis C3, and the rotation axis C4 are parallel with one another.

Now, the upper joint motor 66 of the right arm 14 and the upper joint motor 96 of the left arm 16 are arranged along with the vertical direction. In summary, the upper joint motor 66 of the right arm 14 and the upper joint motor 96 of the left arm 16 include a common rotation axis C3. Further, when the moving body travels normally, the lower joint motor 65 of the right arm 14 and the lower joint motor 95 of the left arm 16 are arranged on the same axis. In summary, the rotation axis C4 of the upper joint motor 66 has the same height as that of the rotation axis C5 of the upper joint motor 96.

As stated above, the upper joint motor 66 and the lower joint motor 65 are mounted to the right arm 14, and the upper joint motor 96 and the lower joint motor 95 are mounted to the left arm 16. The upper joint motors 66 and 96 vary the angle of the body 12 with respect to the upper links 62 and 92. The lower joint motor 65 varies the angle of the upper link 62 with respect to the lower link 64, and the lower joint motor 95 varies the angle of the upper link 92 with respect to the lower link 94. The upper joint motor 66 and the lower joint motor 65 are drive portions (actuators) controlling the angle of the joint of the right arm 14. The upper joint motor 96 and the lower joint motor 95 are drive portions (actuators) controlling the angle of the joint of the left arm 16. Thus, the position of the body 12 with respect to the right chassis 17 and the left chassis 19 can be varied by driving the right arm 14 and the left arm 16. The upper joint motors 66 and 96 and the lower joint motors 65 and 95 are, for example, servomotors that control the posture angle of the body 12. Note that the kinetic power of the motors may be transmitted through gears, belts, pulleys, and the like. The height of the body 12 is varied by driving each of the motors. Thus, the vehicle height of the moving body 100 can be varied.

When the upper joint motor 66 and the upper joint motor 96 are driven, the angle of the pedestal 70 with respect to the right arm 14 and the left arm 16 varies. Thus, the pedestal 70 can be rotated back and forth with the rotation axis C3 being as a rotation center. The rotation axis C3 is parallel to the rotation axes C1 and C2 and positioned above the rotation axes C1 and C2. The right arm 14 is provided between the rotation axis C3 and the rotation axis C1. The left arm 16 is provided between the rotation axis C3 and the rotation axis C2. The lower joint motor 65 rotates the upper link 62 about the rotation axis C4 with respect to the lower link 64. The lower joint motor 95 rotates the upper link 92 about the rotation axis C5 with respect to the lower link 94. Further, the rotation axis C4 is positioned between the rotation axis C3 and the rotation axis C1, and the rotation axis C5 is positioned between the rotation axis C3 and the rotation axis C2. The upper joint motor 66 and the upper joint motor 96 are provided in the rotation axis C3, and serve as swing arms controlling the posture by the right arm 14 and the left arm 16. Note that, when the moving body travels normally, the rotation axis C1 to the rotation axis C5 are parallel, which means that the axes are parallel with the lateral direction of the moving body 100.

The body 12 includes a pedestal 70, a column 72, a gyro-sensor 48, and a passenger seat 22. The flat-plate like pedestal 70 is mounted to the right arm 14 and the left arm 16 through the upper joint motor 66 and the upper joint motor 96, respectively. The right arm 14 and the left arm 16 are provided at the opposing side surfaces of the pedestal 70. In short, the pedestal 70 is disposed between the right arm 14 and the left arm 16.

The pedestal 70 contains a battery module 44 and a sensor 58. The sensor 58 is, for example, an optical obstacle detection sensor that outputs a detection signal upon detection of an obstacle in front of the moving body 100. The sensor 58 may include other sensors in place of the obstacle sensor. For example, the sensor 58 may be an acceleration sensor. As a matter of course, two or more sensors may be used as the sensor 58. The sensor 58 detects variations that vary in accordance with the state of the moving body 100. The battery module 44 supplies electrical power to the sensor 58, the gyro-sensor 48, the right wheel drive motor 34, the left wheel drive motor 36, the upper joint motor 66, the upper joint motor 96, the lower joint motor 65, the lower joint motor 95, a control portion 80, and the like.

The gyro-sensor 48 is provided on the pedestal 70 of the body 12. The gyro-sensor 48 detects an angular velocity with respect to the inclination angle of the body 12. In this case, the term "inclination angle of the body 12" means the degree of the inclination of the position of the center of mass of the moving body 100 with respect to the vertical axis extending upwardly from the axles 30 and 32. For example, the inclination angle of the body 12 is defined to be "positive" when the body 12 is inclined forward in the traveling direction of the moving body 100, and defined to be "negative" when the body 12 is inclined backward in the traveling direction of the moving body 100.

Further, in addition to the front-back direction in the traveling direction, an inclination angle velocity in the lateral direction is also measured by using the three-axis (roll, pitch, and yaw) gyro-sensor 48. In this manner, the gyro-sensor 48 measures variations in the inclination angles of the pedestal 70 as the inclination angle velocities of the body 12. As a matter of course, the gyro-sensor 48 may be mounted in other places. The inclination angle velocities measured by the gyro-sensor 48 vary in accordance with variations in the posture of the moving body 100. That is, the inclination angle velocities are variations that vary in accordance with a shift amount of the position of the center of mass of the body 12 with respect to the positions of the axles. Accordingly, when the inclination angles of the body 12 vary abruptly by a disturbance or the like, the inclination angle velocity values become larger.

The column 72 is provided near the center of the pedestal 70. The column 72 supports the passenger seat 22. That is, the passenger seat 22 is fixed to the pedestal 70 through the column 72. The passenger seat 22 has a chair-like shape on which the passenger can be seated.

A manipulation module 46 is provided on the side surface of the passenger seat 22. A manipulation lever (not shown) and a brake lever (not shown) are provided on the manipulation module 46. The manipulation lever is a manipulation member that is used by the passenger to adjust the traveling velocity and the traveling direction of the moving body 100. The passenger can adjust the traveling velocity of the moving body 100 by adjusting the manipulation amount of the manipulation lever. Further, the passenger can specify the traveling direction of the moving body 100 by adjusting the manipulation direction of the manipulation lever. The moving body 100 can perform forward movements, stops, backward movements, left turns, right turns, left rotations, and right rotations in accordance with manipulations applied to the manipulation lever. The passenger can put a brake on the moving body 100 by tilting the brake lever. The moving body 100 travels in the direction perpendicular to the axles 30 and 32.

Furthermore, the control portion 80 is mounted on the backrest portion of the passenger seat 22. The control portion 80 controls the traveling (movement) of the moving body 100 by controlling the right wheel drive motor 34 and the left wheel drive motor 36 in accordance with the manipulations carried out on the manipulation module 46 by the passenger. The seating surface of the passenger seat 22 is disposed in parallel to the upper surface of the pedestal 70. The control portion 80 controls the right wheel drive motor 34 and the left wheel drive motor 36 in accordance with the manipulations carried out on the manipulation module. In this manner, the right wheel drive motor 34 and the left wheel drive motor 36 are driven at a torque command value in accordance with the manipulations on the manipulation module 46.

The control portion 80 includes a CPU (Central Processing Unit), a ROM (Read Only Memory), a RAM (Random Access Memory), a communication interface, and the like, and controls various operations of the moving body 100. Further, the control portion 80 carries out various control in accordance with a control program stored, for example, in the ROM. The control portion 80 controls the right wheel drive motor 34 and the left wheel drive motor 36 independently from each other by using well-known feedback control at the predetermined angle. The right wheel drive motor 34 and the left wheel drive motor 36 rotate in accordance with the manipulations in the manipulation module 46. The right wheel drive motor 34 and the left wheel drive motor 36 are controlled so as to be able to achieve desired accelerations and target velocity. Thus, the moving body 100 travels by performing acceleration or deceleration in accordance with the manipulations in the manipulation module 46.

To be more specific, the acceleration amount is obtained by the manipulations of the manipulation module 46. In summary, the manipulation module 46 obtains the acceleration amount given by the operation by the passenger. The manipulation module 46 outputs the acceleration amount to the control portion 80 as the manipulation signal. Then, the control portion 80 calculates the target velocity or the accelerations of the moving body 100 based on the manipulation signal. For example, the manipulation module 46 is equipped with the sensor measuring the tilt angle of the manipulation lever or the angular velocity thereof. The tilt angle of the manipulation lever and the angular velocity of the tilt angle become the acceleration amount. To be more specific, the sensor detecting the tilt angle is arranged in the manipulation module 46. Then, the output of the sensor is differentiated to obtain the angular velocity of the tilt angle. Otherwise, on the contrary, the sensor detecting the angular velocity of the tilt angle may be provided in the manipulation module 46. In this case, the angular velocity is integrated to obtain the tilt angle. Needless to say, the manipulation module 46 may include both a sensor for detecting the tilt angle of the manipulation lever and a sensor for detecting the angular velocity thereof.

As stated above, the manipulation module 46 obtains the acceleration amount by the angular velocity of the tilt angle and the tilt angle of the manipulation lever. Then, the control portion 80 calculates the target velocity or the accelerations based on the acceleration amount. The accelerations and the target velocity increase as the tilt angle of the manipulation lever increases. More specifically, the accelerations and the target velocity are calculated by multiplying the tilt angle and the angular velocity thereof by an appropriate gain. Note that the manipulation module 46 may calculate the accelerations or the target velocity based on the acceleration amount. In this case, the accelerations and the target velocity are output as the manipulation signal.

Furthermore, the control portion 80 controls the angle of each joint of the right arm 14 and the left arm 16. Each joint is independently driven. The posture of the moving body 100 varies by driving the right arm 14 and the left arm 16. In short, the control portion 80 controls the height of the moving body 100 and the inclination angle of the lateral direction.

When the right arm 14 or the left arm 16 is driven, the pedestal 70 can be inclined in the lateral direction. In short, it is possible to autonomously swing and incline the body 12 of the moving body 100 in a roll direction (about the longitudinal axis of the moving body 100 parallel with a forward propelling direction). For example, the upper joint motor 66 and the lower joint motor 65 of the right arm 14 are driven to bend the right arm 14 into the dog leg shape. Specifically, the upper joint motor 66 and the lower joint motor 65 are rotated in an opposite direction with each other by a certain angle. Thus, the rotation axis C3 and the rotation axis C1 are close to each other. The vehicle height of the right side of the moving body 100 becomes lower. As such, by independently driving the right arm 14 and the left arm 16, the ride quality for the passenger can be improved. To be more specific, the body 12 can be made parallel in the lateral direction even with the inclination or the step on the ground. In short, it is possible to prevent the body 12 from being inclined in the lateral direction and to improve the ride quality.

For example, the right arm 14 and the left arm 16 are bent with the same angle during a time at which the moving body travels on the level ground. In other words, the distance from the rotation axis C1 to the rotation axis C3 and the distance from the rotation axis C2 to the rotation axis C3 are made equal to each other. Accordingly, the rotation axis C3 becomes parallel, and the body 12 becomes parallel in the lateral direction. When the right driving wheel 18 runs on a step while the moving body is traveling on the level ground, or when the moving body is traveling from the level ground to the inclined ground, the right driving wheel 18 becomes higher than the left driving wheel 20. Then, the rotation axis C3 inclines in the right upward direction and the body 12 is inclined in the lateral direction. In order to prevent the body 12 from being inclined in the lateral direction, the right arm 14 is driven as stated above. Then, the right arm 14 is bent into the dog leg shape and the rotation axis C1 and the rotation axis C3 are close to each other. On the other hand, as the left arm 16 is extended, the rotation axis C2 is away from the rotation axis C3. As such, the inclination of the rotation axis C3 varies, and the body 12 can be made parallel.

More specifically, it is detected by the output from the gyro-sensor 48 that the body 12 is inclined in the lateral direction. The control portion 80 drives one of the arms according to the output from the gyro-sensor 48. In other words, the control portion 80 drives the arm which is made higher by the inclination. For example, when the right side of the body 12 is higher, the control portion 80 controls each joint of the right arm 14. Then, the lower joint motor 65 and the upper joint motor 66 are driven to bend the right arm 14. Further, the right arm 14 is bent by the length corresponding to the inclination angle of the body 12. In other words, the upper joint 61 and the lower joint 63 are driven by the rotation angle corresponding to the inclination angle of the body 12 in the lateral direction. Thus, the rotation axis C3 is made parallel and the body 12 is made parallel in the lateral direction. As a matter of course, when the left side of the body 12 is higher, the left arm 16 is driven in the same way. As such, the right arm 14 and the left arm 16 serve as swing arms that correct the inclination of the body 12 in the parallel direction.

Furthermore, the posture can be varied by driving both of the right arm 14 and the left arm 16. Here, the vehicle height is varied according to the calculated accelerations and the target velocity. In summary, when the accelerations is large or the target velocity is high, the vehicle height is made low. Further, the inclination angle of the body 12 with respect to the axle is varied according to the accelerations.

Figure 3A:
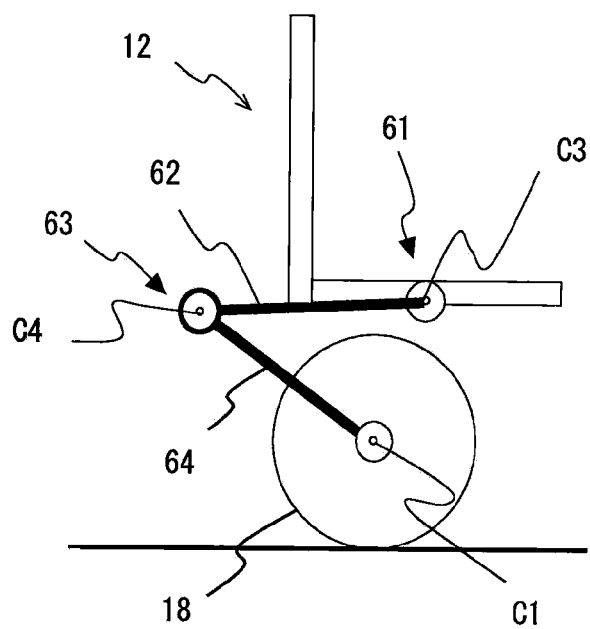
[FIG. 3A] A side view for describing the posture of the moving body according to the embodiment of the present invention.
Figure 3B:
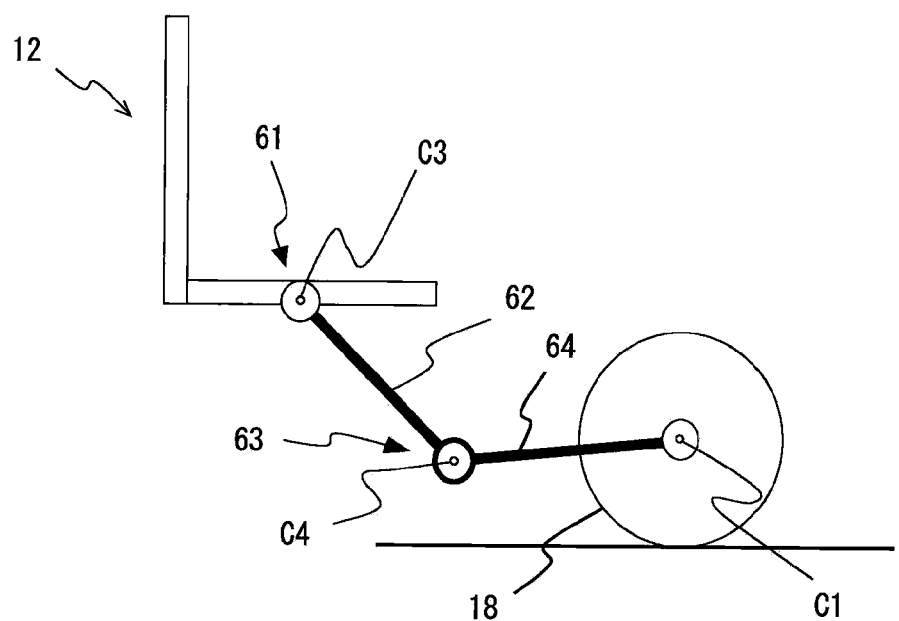
[FIG. 3B] A side view for describing the posture of the moving body according to the embodiment of the present invention.

First, explanation will be made on a case where the abrupt acceleration or deceleration is performed. When the abrupt manipulations is performed in the manipulation module 46, the current velocity is different from the target velocity. When the difference of the current velocity and the target velocity is large, the abrupt acceleration or deceleration is needed. For example, when the target velocity is large enough compared with the current velocity, the moving body 100 needs to perform quick acceleration. When the moving body 100 performs quick acceleration, the vehicle height is made lower. Specifically, the right arm 14 and the left arm 16 are driven to make the axle and the rotation axis C3 close to each other. Further, the right arm 14 and the left arm 16 are driven so that the position of the center of mass of the body 12 with respect to the axle moves in the forward direction. Accordingly, the position of the center of mass of the body 12 moves in the forward direction, as shown in FIG. 3A. FIGS. 3A and 3B are side views describing the operation of the arm of the moving body 100. In FIG. 3A, the rotation axis C3 is provided anterior to the rotation axis C1. Further, the rotation axis C4 is provided posterior to the rotation axis C1. The upper link 62 is provided with the angle which is close to the parallel direction. The rotation axis C3 is provided anterior to the rotation axes C1 and C2, and the posture of the moving body 100 is set to the forward inclined posture.

On the other hand, when the current velocity is high enough compared with the target velocity, the moving body 100 needs to perform quick deceleration. In this case, the accelerations in a backward direction of the moving body 100 is given. When the moving body 100 performs quick deceleration, the vehicle height is made lower. In short, the axle and the rotation axis C3 are made closer. Further, the right arm 14 and the left arm 16 are driven so that the position of the center of mass of the body 12 with respect to the axle moves in the backward direction. Thus, as shown in FIG. 3B, the position of the center of mass of the body 12 moves in the backward direction. In FIG. 3B, the rotation axis C4 is provided posterior to the rotation axis C1. Further, the rotation axis C3 is provided posterior to the rotation axis C4. Accordingly, the rotation axis C3 is provided posterior to the rotation axes C1 and C2, and the posture of the moving body 100 is set to the backward inclined posture.

As such, the inertia or the distance between the axle and the body varies by adjusting the vehicle height according to the target velocity and the accelerations. Thus, the natural frequency of the moving body 100 can be varied. Furthermore, the moving body 100 can obtain the natural frequency suitable for the traveling in the target velocity by adjusting the vehicle height according to the target velocity. For example, when the vehicle height is made lower, the quick acceleration or deceleration can be attained; and when the vehicle height is made higher, slow movement can be attained. In summary, when the vehicle height is made lower, the angular velocity in which the body 12 inclines becomes higher, and the driving wheels need to be rotated quickly. On the other hand, when the vehicle height is raised, the angular velocity in which the body 12 inclines becomes lower, and the driving wheels need to be rotated slowly. It becomes possible to perform the inverted pendulum control in accordance with the target velocity by adjusting the vehicle height. Further, the inclination direction of the moving body 100 is varied according to the direction of the accelerations. In other words, when the forward accelerations is given, the vehicle height is made lower and the posture is set to the forward inclined posture. When the backward accelerations is given, the vehicle height is made lower and the posture is set to the backward inclined posture. As such, the quick acceleration or deceleration can be possible. Hence, it is possible to shorten the time for reaching the target velocity. As it is possible to quickly reach the target velocity intended by the operator, the controllability can be enhanced, and the responsiveness for the operation can be enhanced.

Next, the description will be made on a case where the abrupt acceleration or deceleration is not performed. When the manipulations in the manipulation module 46 becomes substantially constant, the current velocity follows the target velocity. In summary, the velocity is accelerated or decelerated so as to reach the target velocity, so that the current velocity becomes closer to the target velocity. When the current velocity and the target velocity are close to each other, the abrupt acceleration or deceleration is not needed, and the small accelerations is calculated. When the calculated accelerations is small, the vehicle height is made higher than the state shown in FIGS. 3A and 3B. For example, the right arm 14 and the left arm 16 are extended compared with the case of performing the abrupt acceleration or deceleration. Accordingly, the distance from the rotation axis C3 to the rotation axes C1 and C2 becomes larger. When the current velocity and the target velocity are close to each other, the vehicle height is further adjusted according to the target velocity. Accordingly, the distance of the rotation axis C3 with respect to the axle varies according to the target velocity.

When the current velocity exceeds the target velocity, the position of the center of mass of the body 12 with respect to the axle is moved in the backward direction. Accordingly, the position of the center of mass of the body 12 moves to be posterior to the axle. Accordingly, the rotation axis C3 is provided posterior to the rotation axes C1 and C2, and the posture of the moving body 100 is set to the backward inclined posture. In this case, the vehicle height becomes higher than the posture shown in FIG. 3B. On the other hand, when the current velocity does not exceed the target velocity, the position of the center of mass of the body 12 with respect to the axle is moved in the forward direction. Accordingly, the position of the center of mass of the body 12 is moved to be anterior to the axle. The rotation axis C3 is provided anterior to the rotation axes C1 and C2, and the posture of the moving body 100 is set to the forward inclined posture. In this case, the vehicle height becomes higher than the posture shown in FIG. 3A.

As stated above, the posture is varied depending on whether the moving body 100 exceeds the target velocity calculated in the control portion 80. When the current velocity is higher than the target velocity, the body 12 moves in the backward direction. Then, the position of the center of mass of the body 12 is provided posterior to the axle, whereby the rotational velocity of the driving wheels decreases. In short, the velocity is quickly decreased by the inverted pendulum control, so that the current velocity becomes closer to the target velocity. On the other hand, when the current velocity is lower than the target velocity, the body 12 moves in the forward direction. Then, the position of the center of mass of the body 12 is provided anterior to the axle, whereby the rotational velocity of the driving wheels increases. In short, the velocity is quickly increased by the inverted pendulum control, so that the current velocity becomes closer to the target velocity. As such, it is possible to quickly change the velocity of the moving body 100 compared with the related inverted pendulum control. In summary, the velocity of the moving body 100 quickly follows the target velocity compared with the technique of maintaining the inverted state only by the control of the driving wheels. Accordingly, it is possible for the moving body to move substantially at a constant velocity. The responsiveness for the operation can be improved. Accordingly, the controllability can be enhanced. For example, it is possible for the moving body to move in parallel with a pedestrian at a constant velocity.

Figure 4:
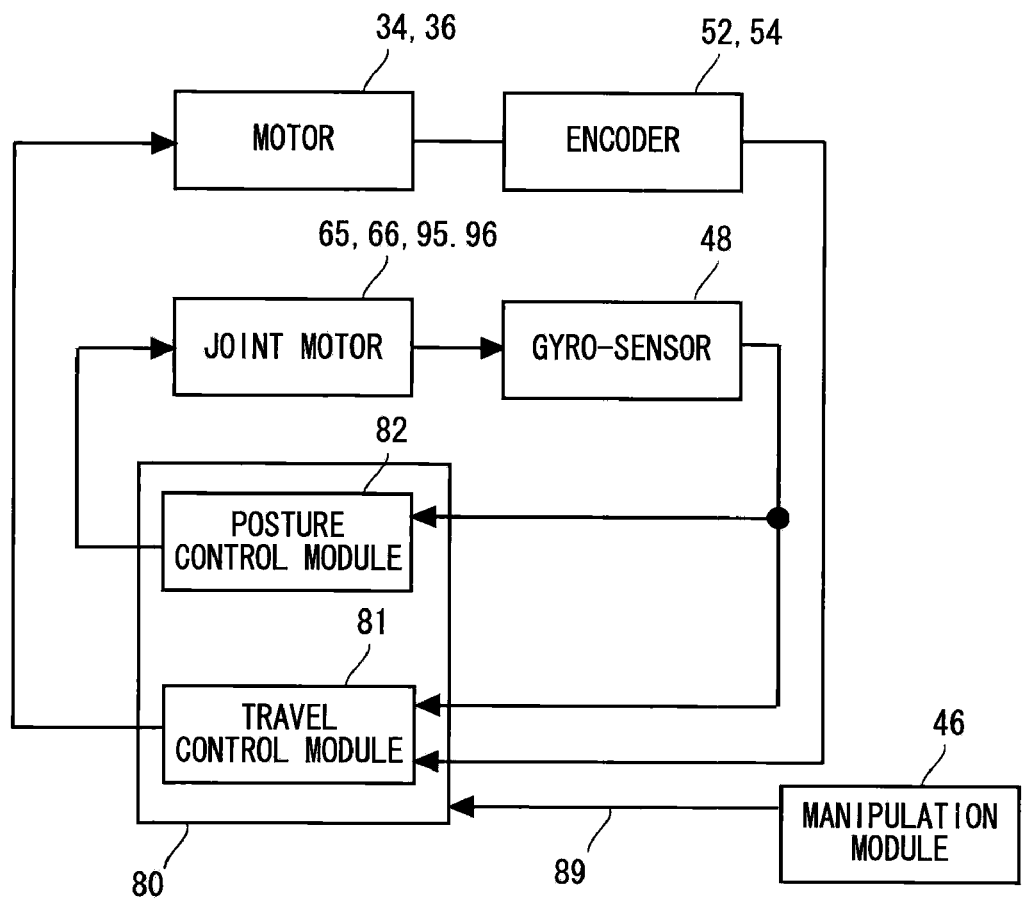
[FIG. 4] A block diagram showing the structure of a control system of the moving body according to the embodiment of the present invention.

Now, the control by the control portion 80 will be described with reference to FIG. 4. FIG. 4 is a block diagram describing the control of the control portion 80. The control portion 80 includes a travel control module 81 and a posture control module 82. The control portion 80 controls the travel control module 81 and the posture control module 82 in an integrated manner. The travel control module 81 includes amplifiers controlling the right wheel drive motor 34 and the left wheel drive motor 36. The travel control module 81 outputs drive signals to the right wheel drive motor 34 and the left wheel drive motor 36, and performs feedback control of the right driving wheel 18 and the left driving wheel 20. More specifically, measured values obtained by the right wheel encoder 52 and the left wheel encoder 54 are input to the travel control module 81. Further, the inclination angle velocity obtained by the gyro-sensor 48 is input to the travel control module 81 so that the inverted state becomes stable. Furthermore, a manipulation signal 89 corresponding to the manipulations carried out on the manipulation module 46 is input to the travel control module 81. Then, the travel control module 81 drives the right wheel drive motor 34 and the left wheel drive motor 36 based on the measured values, the inclination angle velocity, and the command value corresponding to the manipulation signal 89. In this manner, the travel control module 81 performs feedback control of the right driving wheel 18 and the left driving wheel 20. As a result, the moving body 100 moves in accordance with the manipulations carried out on the manipulation module 46. As a result, the moving body 100 travels stably in the inverted state. In this case, a well-known control method can be employed as the feedback control. The moving body 100 travels according to the accelerations and the target velocity calculated by the control portion 80.

The posture control module 82 controls the posture of the moving body 100. That is, the posture control module 82 includes amplifiers that drives the motors of each joint of the right arm 14 and the left arm 16. The posture control module 82 outputs control signals to control the posture of the right arm 14 and the left arm 16. More specifically, a detection signal indicating the inclination angle velocity of the body 12 is input to the posture control module 82 from the gyro-sensor 48. In summary, the inclination angle velocity values of the body 12 detected in the gyro-sensor 48 are input to the posture control module 82. Then, it is detected by the inclination angle velocity detected at the gyro-sensor 48 that the body 12 is inclined in the lateral direction. When the body 12 is inclined in the lateral direction, the right arm 14 or the left arm 16 is driven. In this case, the body 12 drives the arm which is higher to correct the inclination angle. In short, the posture control module 82 controls one of the arms so as to cancel out the inclination angle. Thus, the variations of the inclination angle in the lateral direction decreases, which makes it possible to stably travel the vehicle. It is possible to improve the ride quality for the passenger.

Furthermore, the posture control module 82 adjusts the vehicle height according to the operation by the passenger as stated above. Specifically, both arms are driven according to the calculated accelerations and the target velocity. Thus, the motors of each joint rotate to obtain a desired angle. As such, the vehicle height can be decreased. Further, the posture can be set to the forward inclined posture or the backward inclined posture.

Figure 5:
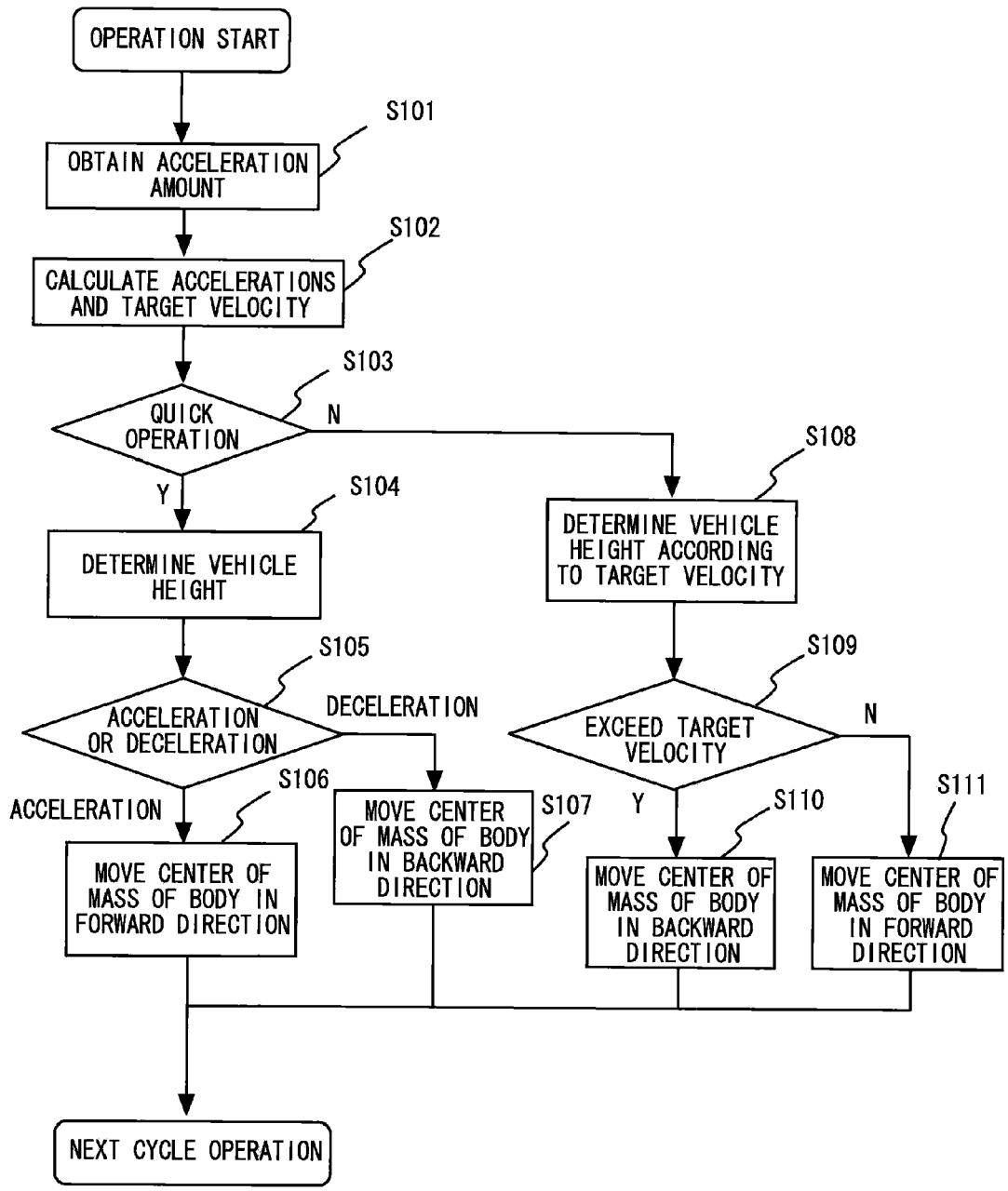
[FIG. 5] A flowchart showing a control method for the moving body according to the embodiment of the present invention.

Now, the control method for the moving body according to the present embodiment will be described with reference to FIG. 5. FIG. 5 is a flowchart showing the control method for the moving body according to the present embodiment. Note that FIG. 5 shows the posture control by the posture control module 82. Accordingly, FIG. 5 is a flowchart describing the drive control of the right arm 14 and the left arm 16.

Upon start of the operation, when the passenger manipulates the manipulation module, the acceleration amount according to the manipulations is obtained (step S101). More specifically, the angular velocity of the tilt angle and the tilt angle of the manipulation lever of the manipulation module 46 are obtained as the acceleration amount. Then, the control portion 80 calculates the target velocity and the accelerations of the moving body 100 based on the magnitude of the acceleration amount (step S102). For example, the control portion 80 multiplies each of the tilt angle and the angular velocity of the tilt angle by the appropriate gain, so as to calculate the accelerations and the target velocity. Here, the travel control module 81 controls the left wheel drive motor 36 and the right wheel drive motor 34 based on the calculated target velocity and the accelerations. Then, the command value corresponding to the accelerations and the target velocity is output as the drive signal. Accordingly, the moving body 100 is accelerated or decelerated by the given accelerations, and the velocity reaches the target velocity. In short, the moving body 100 travels so as to follow the calculated accelerations and the target velocity. The traveling velocity varies according to the calculated accelerations from the current velocity to the target velocity.

Note that the target velocity and the accelerations are calculated with the symbols. For example, the velocity when the moving body 100 performs the forward movement is called positive velocity, and the velocity when the moving body 100 performs the backward movement is called negative velocity. The same explanation can be made for the accelerations. When the positive accelerations is given while the moving body 100 performs the forward movement, the velocity of the moving body 100 further increases. In summary, when it is desired to accelerate the moving body 100, the accelerations having the same symbol as that of the current velocity is given. On the other hand, when the negative accelerations is given while the moving body 100 performs the forward movement, the velocity of the moving body 100 decreases. In summary, when the moving body 100 moves in a low velocity or it is required to stop the moving body 100, the accelerations having the opposite symbol from that of the current velocity is given. On the contrary, when it is desired to accelerate the moving body 100, the accelerations having the same symbol as that of the current velocity is given.

Then, it is determined whether the quick operation is carried out based on the calculated accelerations (step S103). When the quick operation is carried out, the velocity of the moving body 100 abruptly changes from the current velocity. In this case, the accelerations needs to be made larger. Accordingly, it is possible to determine whether the quick operation is carried out based on the calculated accelerations. Specifically, the posture control module 82 determines whether the accelerations is within a certain range. When it is determined that the accelerations is not within the certain range, it is determined that the quick operation is carried out. On the other hand, when the accelerations is within the allowable range, it is determined that the quick operation is not carried out. For example, the threshold value for the accelerations is set in the posture control module 82. Then, it is determined whether the quick operation is carried out by comparing the absolute value of the accelerations with the threshold value. When the absolute value of the accelerations is larger than the threshold value, the abrupt acceleration or the abrupt deceleration is carried out. When the absolute value of the accelerations exceeds the threshold value, it is determined that the quick operation is carried out. When the quick operation is carried out, the rotational velocity of the right driving wheel 18 and the left driving wheel 20 abruptly varies by driving the left wheel drive motor 36 and the right wheel drive motor 34.

When it is determined that the quick operation is carried out, the vehicle height is determined (step S104). When the quick operation is carried out, the vehicle height is made lower. In summary, the vehicle height is determined so that the height becomes lower than the present vehicle height. In this case, for example, the vehicle height is determined to be the height which is preset. Specifically, one vehicle height is selected from among a plurality of vehicle heights that are preset based on the target velocity calculated in step S102. As such, the vehicle height is determined based on the calculated target velocity. As a matter of course, the vehicle height may be determined based on the accelerations. Alternatively, the vehicle height may be determined according to both of the accelerations and the target velocity.

Upon determination of the vehicle height, it is determined whether to accelerate or decelerate (step S105). In summary, it is determined whether the symbol of the accelerations is positive or negative. When the direction of the accelerations accords with the present traveling direction, it is determined to accelerate; when not, it is determined to decelerate. In other words, when the accelerations and the current velocity have the same symbols, it is determined to accelerate; when not, it is determined to decelerate.

When it is determined to accelerate, the center of mass of the body is moved in the forward direction (step S106). In other words, the position of the center of mass of the body 12 is disposed anterior to the axle, and the posture of the moving body 100 is set to the forward inclined posture. In this example, the right arm 14 and the left arm 16 are driven to set the posture as shown in FIG. 3A, for example. In other words, the rotation axis C3 is provided anterior to the rotation axis C1. By driving the right arm 14 and the left arm 16, the position of the center of mass of the body 12 with respect to the rotation axis C1 becomes anterior to the rotation axis C3. Further, the vehicle height of the moving body 100 is equal to the height determined in step S105.

When it is determined to decelerate, the center of mass of the body is moved in the backward direction (step S107). Thus, the position of the center of mass of the body 12 is disposed posterior to the axle, and the posture of the moving body 100 is set to the backward inclined posture. In this example, the right arm 14 and the left arm 16 are driven to set the posture shown in FIG. 3B, for example. In other words, the rotation axis C3 is provided posterior to the rotation axis C1. By driving the right arm 14 and the left arm 16, the position of the center of mass of the body 12 with respect to the rotation axis C1 becomes posterior to the rotation axis C3. Further, the vehicle height of the moving body 100 is equal to the height determined in the step S105.

As stated above, the position of the center of mass of the body 12 with respect to the axle is adjusted based on the accelerations. Specifically, it is determined whether to set the forward inclined posture or the backward inclined posture according to the direction of the accelerations. In short, the direction of the accelerations and the traveling direction of the body 12 by the right arm 14 and the left arm 16 accord with each other. It is also possible to map the vehicle height and the position of the center of mass in advance with respect to the accelerations and the target velocity in order to determine the posture of the moving body 100. A plurality of postures in accordance with the accelerations and the target velocity are registered in advance. In this example, the ranges of the accelerations and the target velocity are made correspondent to each posture. In short, a plurality of postures to which the ranges of the accelerations and the target velocity are made correspondent are stored. Then, one posture is selected from the plurality of postures registered as the map based on the calculated accelerations and the target velocity. In summary, the posture corresponding to the range including the calculated accelerations and the target velocity is selected. Then, the right arm 14 and the left arm 16 are driven to achieve the selected posture. Upon determination of the posture, each joint motor is driven. Specifically, the lower joint motor 65 and the upper joint motor 66 of the right arm 14 are driven to achieve the desired rotation angle. As a matter of course, the lower joint motor 95 and the upper joint motor 96 of the left arm 16 are driven to achieve the desired rotation angle. Thus, the vehicle height and the position of the center of mass of the body 12 can be adjusted.

Note that, in step S106, it is preferable to perform counter torque control which applies the counter torque to the right driving wheel 18 and the left driving wheel 20. More specifically, in order to achieve the forward inclined posture, the right wheel drive motor 34 and the left wheel drive motor 36 apply the counter torque to the right driving wheel 18 and the left driving wheel 20, respectively. The counter torque is applied at a timing where the posture is inclined forward by driving the right arm 14 and the left arm 16, so as to inverse the rotation of the driving wheels. To be more specific, the right wheel drive motor 34 and the left wheel drive motor 36 that are driven in the rotation direction corresponding to the traveling direction are reversed. Then, the counter torque is applied to move the right chassis 17 and the left chassis 19 to the backward of the moving body 100 for a certain period of time. Note that the time for applying the counter torque may be predetermined.

Thus, the right chassis 17 and the left chassis 19 move in the backward direction; however, the body 12 does not move in the backward direction. Thus, it is possible to quickly move the position of the center of mass of the body 12 with respect to the axle in the forward direction. Accordingly, it is possible to reduce the time required to move the position of the center of mass of the body 12 with respect to the axle in the forward direction. Then, the rotational velocity of the wheels is immediately made higher by the inverted pendulum control. Accordingly, the rotational velocity of the wheels is made higher by the feedback control in the travel control module 81. Thus, the quick acceleration and zippy movement can be realized.

The magnitude of the counter torque by the above-stated counter torque control can be varied according to the target velocity, for example. In summary, the value of the counter torque and the target velocity are stored with being made correspondent to each other. Thus, the counter torque value corresponding to the target velocity is set. Then, one counter torque value corresponding to the target velocity is selected from a plurality of counter torque values that are set in advance. Thus, when the body 12 moves in the forward direction, the predetermined counter torque corresponding to the target velocity can be applied to the right and left driving wheels. The counter torque is applied when the vehicle height is made lower and the posture is varied. Accordingly, the quick acceleration can be realized.

Note that, in step S107, forward torque control is preferably performed which applies forward torque to the right driving wheel 18 and the left driving wheel 20. More specifically, in order to achieve the backward inclined posture, the right wheel drive motor 34 and the left wheel drive motor 36 may apply the forward torque to the right driving wheel 18 and the left driving wheel 20, respectively. In short, the rotational velocity of the driving wheels is increased at a timing where the posture is inclined backward by driving the right arm 14 and the left arm 16. In this example, the torque at a timing where the posture is inclined backward is made larger than the torque in the normal feedback control. Thus, the forward torque value which is applied at the timing where the posture is inclined backward is made larger. Then, the rotational velocity of the right wheel drive motor 34 and the left wheel drive motor 36 is made higher. In short, the torque is applied to move the right chassis 17 and the left chassis 19 to the forward of the moving body 100 for the predetermined period of time.

Thus, the right chassis 17 and the left chassis 19 move in the forward direction; however, the body 12 does not immediately follow. Thus, it is possible to quickly move the position of the center of mass of the body 12 with respect to the axle in the forward direction. Accordingly, it is possible to reduce the time required to move the position of the center of mass of the body 12 with respect to the axle in the backward direction. Then, the rotational velocity of the wheels is immediately made lower by the inverted pendulum control. Accordingly, the rotational velocity of the wheels is made lower by the feedback control in the travel control module 81. Thus, the quick deceleration can be realized. Note that the magnitude of the forward torque by the above-described forward torque control can be set in advance as is the same way as the counter torque control. Thus, the forward torque value can be set according to the target velocity.

As such, the counter torque control or the forward torque control is performed according to the timing at which the posture varies. The counter torque value and the forward torque value may be mapped according to the target velocity and the accelerations. The counter torque control and the forward torque control in varying the posture are performed in addition to the feedback control in the travel control module 81. In summary, the counter torque or the forward torque is applied in addition to the torque value in the feedback control by the travel control module. Thus, in applying the counter torque, the counter torque value is added to the torque value by the feedback control to calculate the torque applied to the driving wheels. In this case, the torque obtained by adding the torque value in the feedback control to the predetermined counter torque value or the forward torque value is applied to the right driving wheel 18 and the left driving wheel 20 through the right wheel drive motor 34 and the left wheel drive motor 36.

As such, the counter torque control or the forward torque control is performed based on the timing at which the position of the center of mass of the body 12 varies. Thus, the travel control module 81 moves the right chassis 17 and the left chassis 19 in a direction opposite to the traveling direction of the position of the center of mass in synchronization with the timing at which the posture varies. In summary, the travel control module 81 controls the drive of the right wheel drive motor 34 and the left wheel drive motor 36 at a timing where the posture control module 82 varies the posture, so as to move the right chassis 17 and the left chassis 19 in the opposite direction. Accordingly, the quick acceleration or deceleration can be achieved.

As stated above, the torque of direction opposite to the direction where the posture varies by driving the arms is applied to the driving wheels. In varying the posture by the posture control module, the driving wheels are driven so that the chassis moves in a direction opposite to the traveling direction of the body 12 with respect to the axle. Thus, it is possible to quickly reach the target velocity. Accordingly, the responsiveness with respect to the manipulations and the controllability can be enhanced.

When it is determined in the step S103 that the quick operation is not performed as shown in FIG. 5, the vehicle height is determined according to the target velocity (step S108). In short, the vehicle height based on the target velocity is set. Accordingly, when the target velocity is high, for example, the vehicle height becomes lower; and when the target velocity is low, the vehicle height becomes higher.

Then, it is determined whether the current velocity exceeds the target velocity (step S109). More specifically, the current velocity and the calculated target velocity are compared to determine whether the current velocity exceeds the target velocity according to the comparing result. Note that the current velocity can be obtained from the output of the encoder, for example. In this step, the determination may be performed according to the direction of the accelerations.

When it is determined that the current velocity exceeds the target velocity, the center of mass of the body 12 is moved in the backward direction (step S110). More specifically, the position of the center of mass of the body 12 is provided posterior to the axle, and the posture of the moving body 100 is set to the backward inclined posture. In this example, the backward inclined posture can be realized by driving the right arm 14 and the left arm 16. The rotation axis C3 is provided posterior to the rotation axis C1. By driving the right arm 14 and the left arm 16, the position of the center of mass of the body 12 with respect to the rotation axis C1 is posterior to the rotation axis C3. Further, the vehicle height of the moving body 100 is made equal to the height determined in the step S108.

Note that the backward inclined posture in the step S110 is different from the backward inclined posture in the step S107. More specifically, the degree of the backward inclined posture in the step S110 is smaller than that of the step S107. In summary, in the backward inclined posture of the step S110, the position of the center of mass of the body 12 in the front-back direction is closer to the axle than the backward inclined posture in the step S107. Further, the posture in the step S110 has a greater vehicle height than the posture of the step S107. Accordingly, the distance between the rotation axis C3 and the axle is larger in the posture of the step S110 than that in the posture of the step S107. Accordingly, the backward inclined posture in the step S107 is more inclined than the backward inclined posture in the step S110. It is also possible to perform the forward torque control in the step S110 as is the same way as in the step S107. In the step S110, the forward torque value is applied which is smaller than the forward torque value applied in the step S107. Accordingly, it is possible to travel with the stable inverted state.

When it is determined that the current velocity does not exceed the target velocity, the center of mass of the body is moved in the forward direction (step S111). Accordingly, the position of the center of mass of the body 12 is provided anterior to the axle, and the posture of the moving body 100 is set to the forward inclined posture. In this example, the forward inclined posture can be realized by driving the right arm 14 and the left arm 16. The rotation axis C3 is provided anterior to the rotation axis C1. By driving the right arm 14 and the left arm 16, the position of the center of mass of the body 12 with respect to the rotation axis C1 is moved to the position anterior to the rotation axis C3. Further, the vehicle height of the moving body 100 is made equal to the height determined in the step S108.

Note that the forward inclined posture of the step S111 is different from the forward inclined posture of the step S106. More specifically, the degree of the forward inclined posture in the step S111 is made smaller than that of the step S106. In the forward inclined posture of the step S111, the position of the center of mass of the body 12 in the front-back direction is made closer to the axle than the forward inclined posture of the step S106. Further, in the posture of the step S111, the vehicle height is made greater than the posture of the step S106. In summary, the distance between the rotation axis C3 and the axle is larger in the posture of the step S111 than that in the posture of the step S106. Accordingly, the inclination angle of the forward inclined posture in the step S106 is made larger than the inclination angle of the forward inclined posture in the step S111. Further, the counter torque control can be carried out also in the step S111 as is the same way as in the step S106. In the step S111, the counter torque value is applied which is smaller than the counter torque value applied in the step S106. Accordingly, it is possible to travel with the stable inverted state. Further, the posture may be selected from the postures stored as the map in the step S110 and the step S111 as well. Thus, the joint angle may be determined according to the accelerations and the target velocity.

As stated above, by determining the vehicle height according to the target velocity, the distance between the axle and the body 12 varies. When the vehicle height is made lower, the body 12 is made closer to the axle. Then, the natural frequency of the body 12 varies; and therefore, the natural frequency can be optimized in accordance with the situation. Accordingly, even when the target velocity varies, it is possible to quickly reach the target velocity. The posture is made suitable for traveling with the target velocity. Accordingly, the stable traveling and the high safety can be realized. Note that, even when the moving body 100 is moved in the backward direction, the control can be performed in the same way. In this case, in the above description, the forward inclined posture and the backward inclined posture are exchanged. Alternatively, the control of the posture and the vehicle height may be executed by mechanisms other than the swing arms. Further alternatively, the control of the vehicle height and the change of the posture may be executed by different actuators. For example, a plurality of slide joints may be provided to control each of the vehicle height and the posture. Further, as the posture control and the travel control can be independently performed, the control system can be made simple. Accordingly, it is possible to simply improve the controllability.

As stated above, the intention of the passenger for the moving body 100 can be estimated by the manipulations in the manipulation module. In summary, it is estimated by the manipulations in the manipulation module whether the passenger wants to perform the acceleration (deceleration) or just travel in the constant velocity. For example, the right driving wheel 18 and the left driving wheel 20 are rotated so as to follow the calculated accelerations to reach the target velocity. Additionally, the posture of the body 12 is controlled by driving the right arm 14 and the left arm 16. More specifically, the body 12 is moved in the direction of the accelerations. Accordingly, the current velocity can quickly reach the target velocity and smoothly change the velocity. As such, it becomes possible to perform traveling at a desired velocity with complete freedom and to perform zippy acceleration or deceleration.

Although the two-wheel type moving body 100 has been described in this embodiment, the number of wheels is not limited to such examples. The present invention is also applicable to single-wheel type moving bodies or to moving bodies having three or more wheels. As a matter of course, one arm or three or more arms may be used. Further, although the moving body 100 is explained with the assumption that an operator is on the moving body 100 in the above description, the present invention is not limited to such examples. For example, the present invention is also applicable to a moving body that is operated by remote control. Furthermore, although the moving body 100 having the passenger seat 22 is explained in the above description, the moving body 100 may be a moving carriage for transporting objects. As a matter of course, the moving body 100 may be other similar moving bodies such as mobile robots.

INDUSTRIAL APPLICABILITY

The present invention is widely applicable to an inverted wheel type moving body which moves by the rotation of wheels and the method of controlling the same.

The invention claimed is:

1. An inverted wheel type moving body accelerating or decelerating according to operation by an operator, the inverted wheel type moving body comprising:
a chassis rotationally supporting a wheel;
a first drive portion rotationally driving the wheel;
a body rotatably supported on the chassis through a support member;
a second drive portion disposed in the support member and varying vehicle height of the inverted wheel type moving body;
a first control portion controlling the first drive portion so as to follow an acceleration calculated based on the operation by the operator; and
a second control portion controlling the second drive portion to lower the vehicle height and change a position of a center of mass of the body with respect to an axle of the wheel in a front-back direction in accordance with the acceleration when the acceleration exceeds a certain range,
wherein the inverted wheel type moving body controls the second drive portion to move the position of the center of mass of the body with respect to the axle of the wheel in the front-back direction and to change the vehicle height in accordance with a target velocity calculated based on the operation by the operator when the acceleration is within the certain range.

2. An inverted wheel type moving body accelerating or decelerating according to operation by an operator, the inverted wheel type moving body comprising:
a chassis rotationally supporting a wheel;
a first drive portion rotationally driving the wheel;
a body rotatably supported on the chassis through a support member;
a second drive portion disposed in the support member and varying vehicle height of the inverted wheel type moving body;
a first control portion controlling the first drive portion to allow the inverted wheel type moving body to reach a target velocity calculated based on the operation by the operator; and
a second control portion controlling the second drive portion to move a position of a center of mass of the body with respect to an axle of the wheel in a front-back direction and to change the vehicle height in accordance with the target velocity.

3. The inverted wheel type moving body according to claim 1, wherein the first drive portion applies torque to the wheel to move the wheel in a direction opposite to a direction moving the position of the center of mass of the body in accordance with a timing at which the position of the center of mass of the body varies.

4. A method of controlling an inverted wheel type moving body, the inverted wheel type moving body comprising:
a chassis rotationally supporting a wheel;
a first drive portion rotationally driving the wheel;
a body rotatably supported on the chassis through a support member; and
a second drive portion disposed in the support member and varying vehicle height, the method comprising:
a step of calculating an acceleration based on operation by an operator;
a step of driving the first drive portion to allow the inverted wheel type moving body to follow the acceleration;
a step of driving the second drive portion to lower the vehicle height and change a position of a center of mass of the body with respect to an axle of the wheel in a front-back direction in accordance with the acceleration when the acceleration exceeds a certain range; and
controlling the second drive portion to move the position of the center of mass of the body with respect to the axle of the wheel in the front-back direction and to change the vehicle height in accordance with a target velocity calculated based on the operation by the operator when the acceleration is within the certain range.

5. A method of controlling an inverted wheel type moving body, the inverted wheel type moving body comprising:
a chassis rotationally supporting a wheel;
a first drive portion rotationally driving the wheel;
a body rotatably supported on the chassis through a support member; and
a second drive portion disposed in the support member and varying vehicle height, the method comprising:
a step of calculating a target velocity based on operation by an operator;
a step of driving the first drive portion to allow the inverted wheel type moving body to reach the target velocity; and
a step of driving the second drive portion to move a position of a center of mass of the body with respect to an axle of the wheel in a front-back direction and to change the vehicle height in accordance with the target velocity.

6. The method of controlling the inverted wheel type moving body according to claim 4, wherein the first drive portion applies torque to the wheel to move the wheel in a direction opposite to a direction moving the position of the center of mass of the body in accordance with a timing at which the position of the center of mass of the body varies.

7. The inverted wheel type moving body according to claim 2, wherein the first drive portion applies torque to the wheel to move the wheel in a direction opposite to a direction moving the position of the center of mass of the body in accordance with a timing at which the position of the center of mass of the body varies.

8. The method of controlling the inverted wheel type moving body according to claim 5, wherein the first drive portion applies torque to the wheel to move the wheel in a direction opposite to a direction moving the position of the center of mass of the body in accordance with a timing at which the position of the center of mass of the body varies.

* * * * *